United States Patent [19]

Tomisawa et al.

[11] 3,806,895

[45] Apr. 23, 1974

[54] PHOTOCONDUCTIVE MEMORY DEVICE

[75] Inventors: Norio Tomisawa; Takehisa Amano, both of Hamamatsu; Yasuji Uchiyama, Hamakita; Takatoshi Okumura, Hamamatsu, all of Japan

[73] Assignee: Nippon Gakki Seizo Kabushiki Kaisha, Hamamatsu-shi, Shizuoka-ken, Japan

[22] Filed: Sept. 18, 1972

[21] Appl. No.: 289,884

[30] Foreign Application Priority Data

Sept. 16, 1971 Japan ................................ 46-71996

[52] U.S. Cl...................... 340/173 LM, 250/211 R, 340/173 LS, 340/173 LT, 346/74 P

[51] Int. Cl......................... G11c 13/04, G11c 27/00

[58] Field of Search.... 340/173 R, 173 LT, 173 LS, 340/173 LM; 346/74 P; 250/211 R

[56] References Cited

UNITED STATES PATENTS

| | | | |
|---|---|---|---|
| 3,491,344 | 1/1970 | Ferber | 340/173 R |
| 2,896,086 | 7/1959 | Wonderman | 340/173 LT |
| 3,026,417 | 3/1962 | Tomlinson | 340/173 LS |
| 3,342,539 | 9/1967 | Nelson | 340/173 LM |
| 3,165,634 | 1/1965 | Raymond | 340/173 LS |
| 3,474,417 | 10/1969 | Kazan | 340/173 LS |
| 3,410,203 | 11/1968 | Fischbeck | 340/173 LM |

OTHER PUBLICATIONS

Sunstein, Photoelectric Waveform Generator, Electronics, 2/49, pp. 100–103.

*Primary Examiner*—James W. Moffitt
*Assistant Examiner*—Stuart N. Hecker
*Attorney, Agent, or Firm*—Holman & Stern

[57] ABSTRACT

A photoconductive memory device comprising an electrically non-conductive substrate, a plurality of stripes made of a photoconductive layer deposited on the substrate, and a mask having a transparent part and an opaque part delimited by a marginal area of a configuration corresponding to a shape of wave or function to be memorized, whereby when the photoconductive stripes are irradiated by light through the mask, the wave shape or function shape can be memorized as sampled analog values on the photoconductive stripes in the form of a plurality of electrical resistance values.

7 Claims, 24 Drawing Figures

FIG. 9(a)
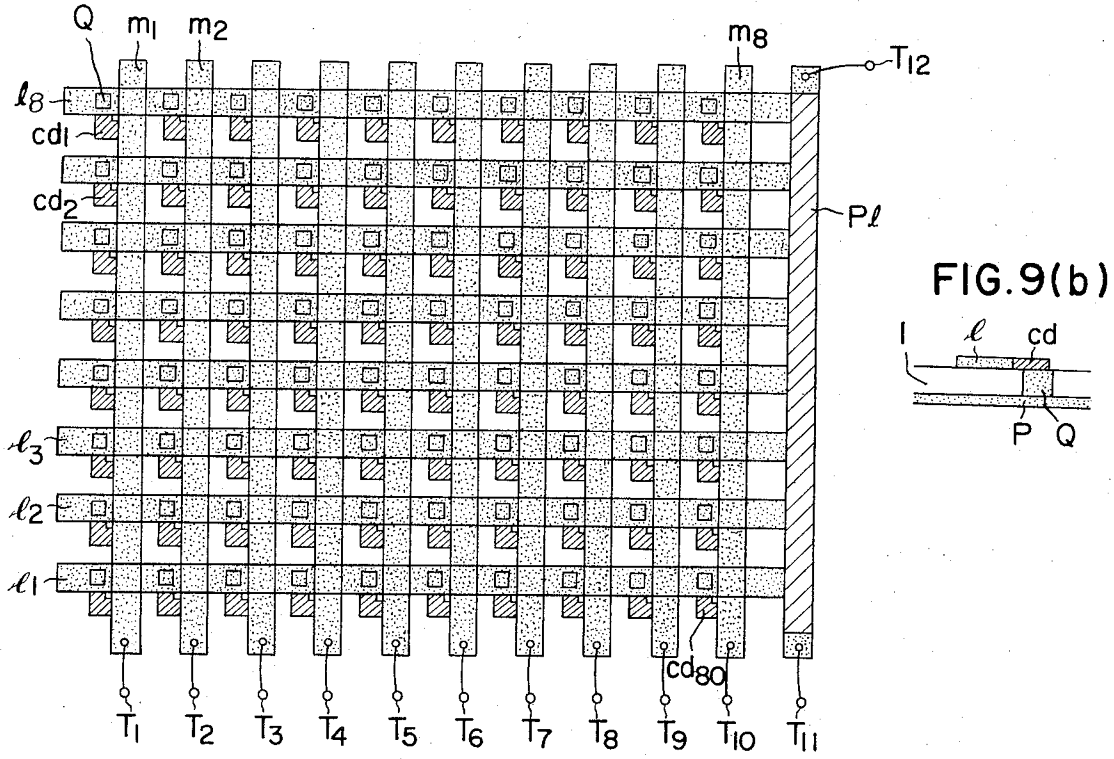
FIG. 9(a), FIG. 9(b)
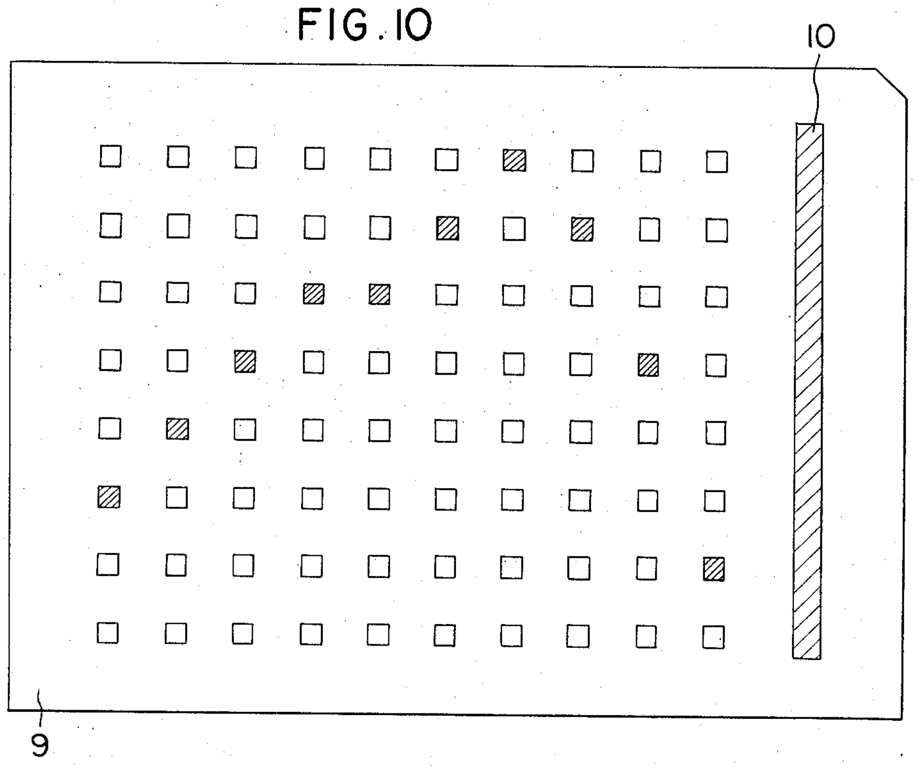
FIG. 10

PHOTOCONDUCTIVE MEMORY DEVICE

BACKGROUND OF THE INVENTION

This invention relates generally to photoconductive memory devices, and more particularly to a type thereof wherein a plurality of stripes of photoconductive layer provided on a substrate are exposed to light in accordance with a pattern (wave shape), and analog values corresponding to the pattern in a sampled fashion can be memorized in the photoconductive layer.

In conventional memory devices which serve to memorize analog quantities, individual memory elements such as resistors whose values are determined in correspondence to analog quantities to be memorized therein are provided and the analog quantities memorized therein are read out by successively providing electrical connection to the elements with the aid of mechanical contacts.

However, in such a conventional memory device, memorizing elements must be provided respectively for analog quantities: that is, one element is necessary for one analog quantity. Therefore, it is necessary to provide a number of the elements in the conventional memory device, as a result of which the conventional memory device is inevitably large in size. In addition, since the number of the elements must be increased in order to improve the sampling accuracy of analog information, in view of the dimensions of the memory device, there is a limit in improving the sampling accuracy of analog information. Therefore, the sampling accuracy of the conventional memory device is rather low.

These elements memorizing an analog quantity are dispersed in value, even if they are manufactured with case. Resultantly, the elements of high precision are considerably high in price. Furthermore, the values of such elements available in market are standardized, and a special order must be therefore given for memory elements whose values are present between the standardized values. This also will cause the price of the element to be higher.

In addition, the conventional analog memory device carries out its information read-out with the aid of mechanical contacts. Accordingly, the service life of the mechanical contacts will become one of the important operational factors of the conventional analog memory device. Furthermore, the conventional analog memory device suffers from the fact that its read-out speed is relatively slow.

There have been various memory elements, such as magnetic memory elements or semiconductor type memory elements which are used for memorizing digital information; however, it is necessary to provide a digital-analog converter (D-A) in order to obtain the analog information from the reading of these elements. Furthermore, if the number of bits of the digital-analog converter were limited to a certain value, the accuracy of analog output information would be worse.

A function generator which successively generates predetermined voltage upon receiving of clock inputs has been utilized as a memory read device of analog information. The function generators being used now can be classified briefly into two types, namely, electron tube type and servo-motor type. However, these function generators are high in price, and especially the electron tube type function generators are low in both accuracy and stability, and the servo-motor type function generators are low in reliability and upper speed limit because they have mechanical parts.

In addition, there is, for instance, a musical tone generating device which necessitates an intricate analog waveform. In the musical tone generating device, in order to create a musical tone waveform, the outputs from many oscillators oscillating different frequencies are combined together, and a waveform containing harmonic tone components is made to pass through intricate filters. However, the device according to such conventional methods as described above necessitates a number of oscillators and filters, as a result of which the device becomes complicate in construction and low in stability. Furthermore, in the conventional device it is impossible to obtain an intricate waveform containing the thirtieth harmonic tone or higher which is included in the tones of a natural musical instrument such as a piano and the like.

A conventional digital-analog converter comprises a number of switches and resistance networks. In the conventional digital-analog converter, predetermined switches are closed in response to digital signals thereby obtaining necessary analog signals from the resistance networks.

However, in such a conventional digital-analog converter, a number of resistance elements are arranged in a resistance network and many switches are used. As a result of which, the conventional digital-analog converter is caused to be large in size. Furthermore, since the resistance elements are apt to be dispersed in value in the process of manufacturing time, the converter would be high in price if the resistance elements of high precision were used therein. In addition, since there is a limit in the operating speed of each switch, there is also a limit in the conversion at a high rate.

SUMMARY OF THE INVENTION

A primary object of the present invention is to provide an analog-quantity memorizing device wherein any desired waveform can be easily memorized and which is simple in construction and can be easily manufactured.

Another object of the invention is to provide a photoconductive type analog-quantity memorizing deivce wherein the waveform can be read out directly in a series of resistance values representing respective sampled values of the waveform.

Still another object of the invention is to provide a photoconductive type analog-quantity memorizing device wherein a plurality of memorizing elements in the form of photoconductive striped layers can be read out through a commonly provided reading device.

These and other objects of the present invention can be achieved by a novel construction of an analog-quantity memorizing device comprising at least a non-conductive substrate, a plurality of stripes made of a photoconductive layer deposited on the substrate, and a mask having a transparent part and an opaque part for representing a pattern corresponding to a waveform to be memorized, whereby when the photoconductive stripes are irradiated by light through the mask, the waveform can be memorized as sampled analog values on the photoconductive stripes in the form of a series of resistance values representing sampled values of the waveform.

The nature, principle, and the utility of the present invention will be more clearly understood from the following detailed description of the invention when read in conjunction with the accompanying drawings wherein like parts or members are designated by like reference numerals or characters.

BRIEF DESCRIPTION OF THE DRAWINGS

In the drawings:

FIG. 9(a) and 9(b) are a plan view and a partial sectional view showing an additional example of the memorizing element employed in the invention;

FIG. 10 is a plan view indicating a mask used with the memorizing element shown in FIG. 9;

DETAILED DESCRIPTION OF THE INVENTION

Figure 1:
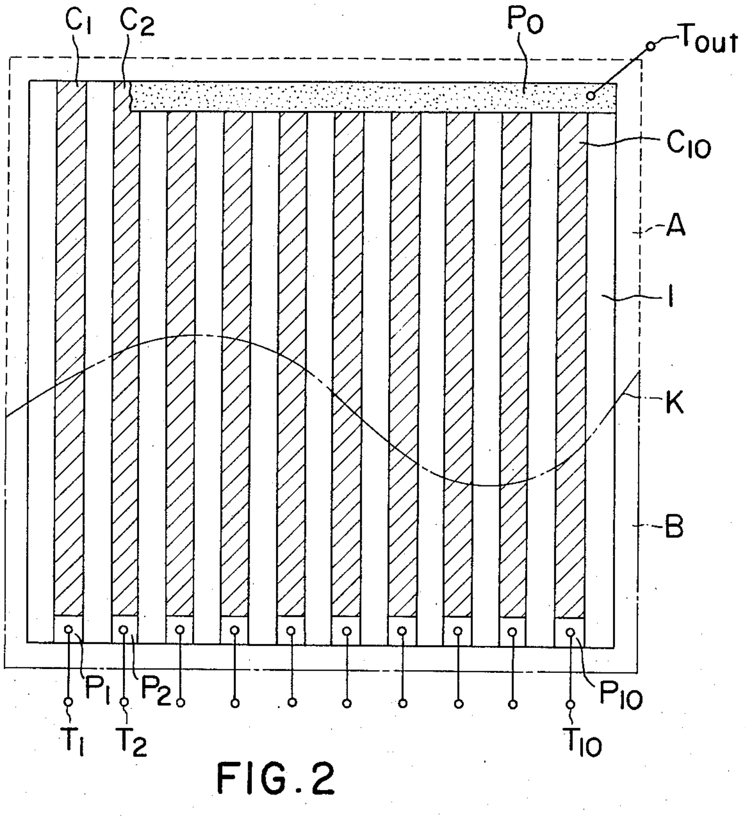
FIG. 1 is a plan view showing an example of the photoconductive type memory element used in the present invention.

Referring first to FIG. 1 showing an example of the photoconductive type memory device according to the present invention, there are indicated a plurality of band-like areas $C_1$, $C_2$, . . . , $C_{10}$, having a constant width, of a photoconductive layer made of, for instance, CdS and formed on a substrate 1 made of, for instance, a glass plate or the like by the use of a printing process, blast-depositing process, or a vapor depositing process (hereinafter called simply a depositing process).

Electrodes $P_1$, $P_2$, . . . , $P_{10}$ made of, for instance, silver, gold, aluminum, or the like, are provided at the ends of the band-like areas or stripes $C_1$, $C_2$, . . . , $C_{10}$ on one side, and the other ends of the stripes $C_1$, $C_2$, . . . . , $C_{10}$ on the other side are connected together and terminated into a common electrode $P_o$.

A region A defined by broken lines in FIG. 1 corresponds to a part of the substrate, now constructed into a memorizing element, irradiated by light rays through a mask 2 of a desired pattern, as will be hereinafter described in more detail, and a remaining region B or the thus constructed memorizing element corresponds to a part of the substrate masked by an opaque part of the mask 2. A line K thus delimiting the regions A and B may be formed into any desired pattern corresponding to a waveform to be memorized in this device.

When the region A is irradiated, the resistance values of the photoconductive band-like areas or stripes $C_1$, $C_2$, . . . . , $C_{10}$ included in the region A and exposed to the light rays are reduced as is well known in the art. On the other hand, the resistance of the parts of the photoconductive stripes included in the region B are maintained at their original comparatively high values.

Figure 2:
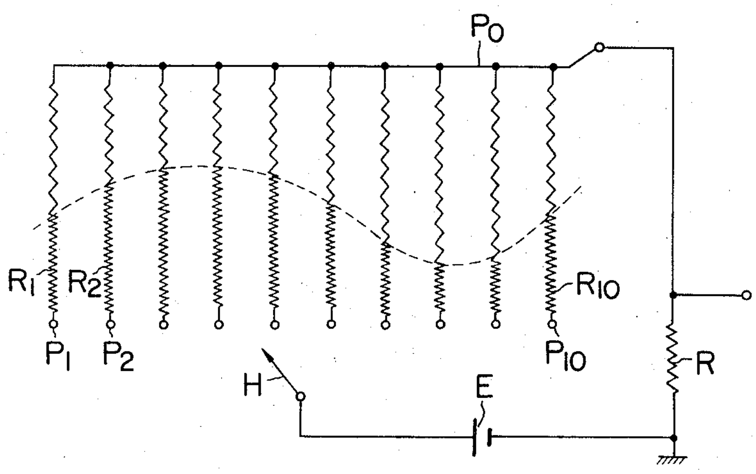
FIG. 2 is an electric equivalent circuit for a memory device wherein the element shown in FIG. 1 is used.

The memorizing element of the above described construction can be expressed as an equivalent circuit as indicated in FIG. 2, wherein the memorizing element is indicated as being in a state cooperating with a readout switching device of a rotary switch type.

In the equivalent circuit, resistance values $R_1$, $R_2$, . . . . , $R_{10}$ representing the photoconductive stripes $C_1$, $C_2$, . . . . , $C_{10}$ are varied in accordance with the lengths of the parts not exposed to light of the photoconductive stripes $C_1$, $C_2$, . . . . , $C_{10}$, defined by the line K. Thus, whenever a sliding contact H of the rotary switch connected to a power source E is successively brought into contact with the electrodes $P_1$, . . . . , $P_{10}$, an electric current is caused to flow through a resistor R connected between the power source E and the common terminal $P_o$, and analog voltages corresponding to the sampled values of the pattern represented by the line K can be successively read out across the outside resistor R.

Various examples of the mask 2 used for irradiating only a desired region of the memorizing element are indicated in FIG. 3. In each of these examples, a black plastic plate 3 is laid over a transparent plastic plate 2, and the configuration of a side edge 3*a* of the black plastic plate 3 is shaped into a pattern employing the same sort of tools used, for instance, in a ruby cutting process in manufacturing a mask for the production of integrated circuits.

Figure 3A:
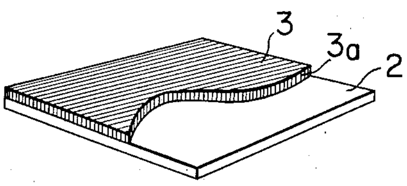
FIGS. 3(a) through 3(e) are perspective views showing various examples of masks.
Figure 3B:
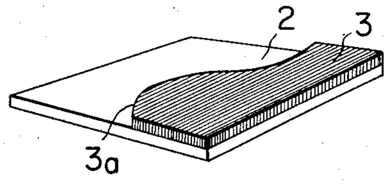
Figure 3C:
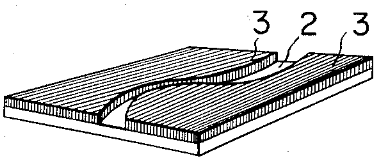
Figure 3D:
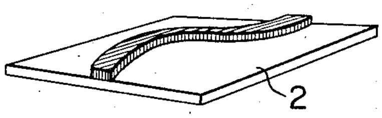
Figure 3E:
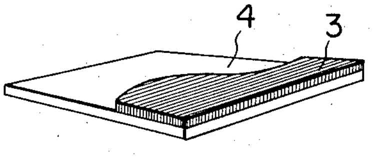
Figure 4:
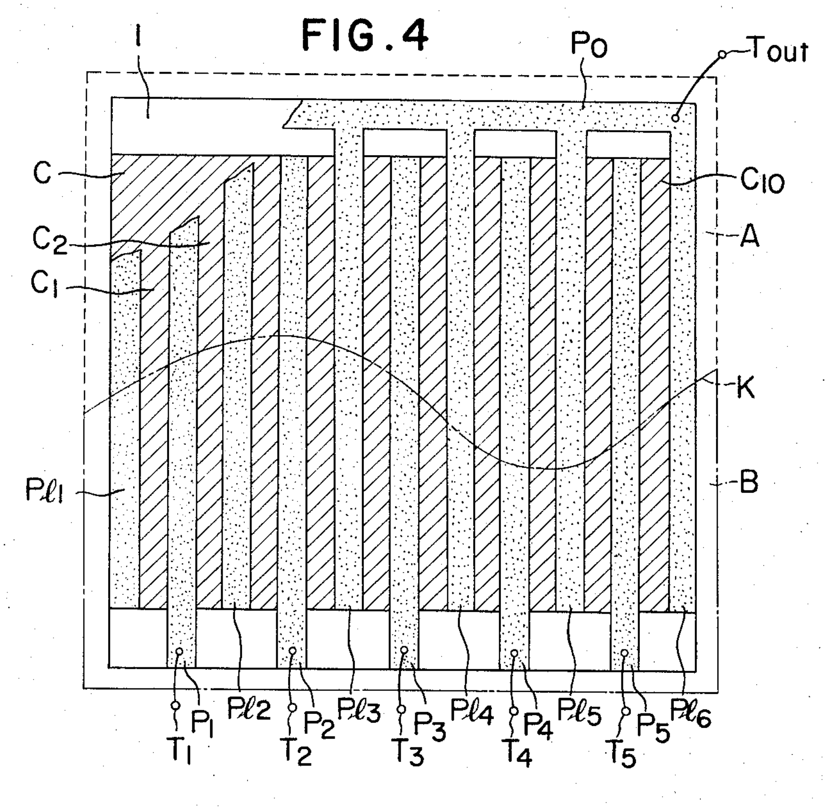
FIG. 4 is a plan view showing another example of the memorizing element.
Figure 5:
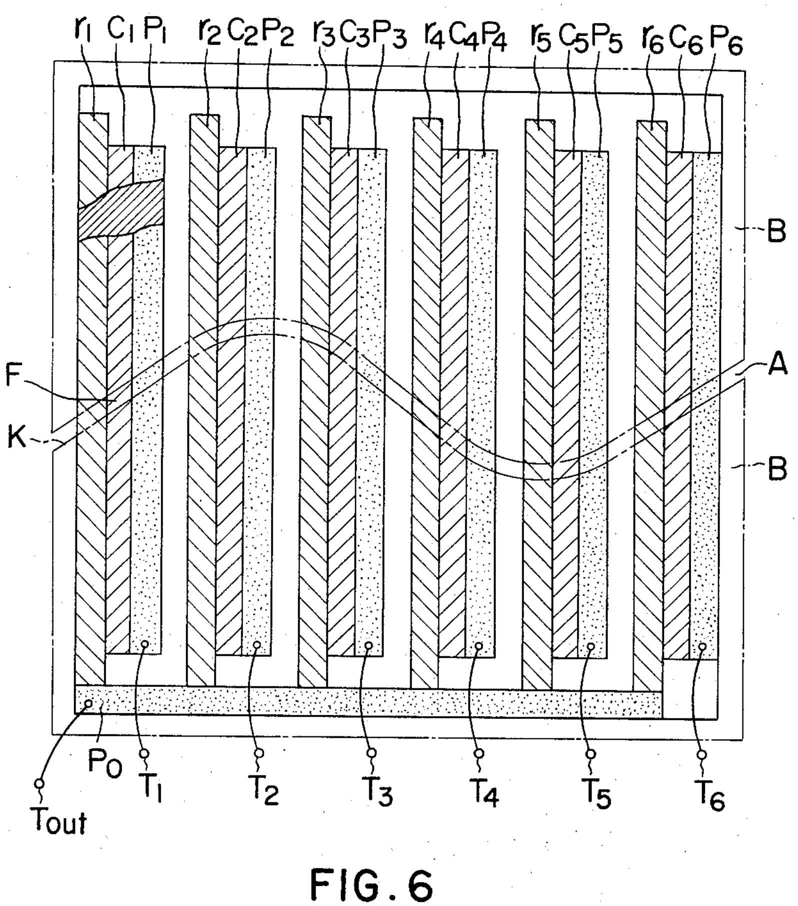
FIG. 5 is a plan view showing still another example of the memorizing element.

Those indicated in FIGS. 3(a) and 3(b) are masks to be used with the memory elements shown in FIGS. 1 and 4, respectively, and that indicated in FIG. 3(c) is a mask to be used with a memory element indicated in FIG. 5. The mask shown in FIG. 3(e) is an example wherein a black plastic plate is placed on a milk-white plastic plate. The milk-white plate affords a sufficient amount of transparency, and the resistance ratio between the irradiated part and non-irradiating part of the photoconductive layer are selected to be sufficiently high.

FIG. 4 indicates another example of the photoconductive memory element forming a part of the present invention, wherein a photoconductive layer C is deposited on substantially the entire surface of the substrate 1, and connecting electrodes $P_1$, $P_2$, . . . . , $P_5$ and an output electrode $P_o$ made of an electrically conductive layer are deposited over the photoconductive layer C. The output electrode $P_o$ is branched into a number of electrode portions $Pl_1$, $Pl_2$, . . . , $Pl_6$ of a constant width. The electrode portions are interposed in an alternate manner between the connecting electrodes $P_1$, $P_2$, . . . , $P_5$ also of a constant width maintaining a constant width of photoconductive stripes $C_1$, $C_2$, . . . . , $C_{10}$ therebetween. That is, the branches of the output electrode $Pl_1$, $Pl_2$, . . . , $Pl_6$, connecting electrodes $P_1$, $P_2$, . . . , $P_5$, and the photoconductive stripes $C_1$, $C_2$, . . . . , $C_{10}$ are arranged in the order of, for instance, $Pl_1$, $C_1$, $P_1$, $C_2$, $Pl_2$, $C_3$, $P_2$, $C_4$, $Pl_3$, . . . . , $Pl_5$, $C_9$, $P_5$, $C_{10}$, $Pl_6$, as is indicated in FIG. 4.

Now, if the region A defined by the line K is irradiated by light, the resistances of the parts included in the region A of the photoconductive stripes $C_1$, $C_2$, $C_3$, . . . , $C_{10}$ are reduced while the resistances of the parts thereof included in the region B remain unchanged. Accordingly, if the memory element cooperates with a read out device wherein a power source is to be connected to a terminal $T_1$ provided on the connecting electrode $P_1$, an electric current, one part thereof flowing from the electrode $P_1$ through the photoconductive stripe $C_1$ to the output electrode portion $Pl_1$, and the other part thereof flowing from the electrode $P_1$ through the photoconductive stripe $C_2$ to the output electrode portion $Pl_2$, flows from the terminal $T_1$ of the memory element to an output terminal T out of the readout device, and the resistance of the circuit between the input terminal $T_1$ and the output terminal T out corresponds substantially to the high-resistance parts, belonging to the region B, of the photoconductive stripes $C_1$ and $C_2$.

The resistances of the circuits starting from terminals $T_2$, $T_3$, . . . , $T_5$ of the memory element and ending at the output terminal T out of the readout device are likewise in correspondence with the high-resistance parts, included in the region B, of the photoconductive stripes of, for instance, $C_3$ and $C_4$, $C_5$ and $C_6$, and so on, respectively. The equivalent circuit for this example of the memory element in cooperation with the readout device will thus be equal to that indicated in FIG. 2.

Still another example of the memory element according to the present invention is shown in FIG. 5. In this third embodiment of the invention, there are provided photoconductive layer stripes $C_1$, $C_2$, . . . . , $C_6$, resistance stripes $r_1$, $r_2$, . . . . , $r_6$, and electrodes $P_1$, $P_2$, . . . . , $P_6$ on a substrate similar to that of the preceding examples. Each corresponding pair of the resistance stripes $r_1$, $r_2$, . . . . , $r_6$ and the electrodes $P_1$, $P_2$, . . . . , $P_6$ are arranged at both sides of a corresponding one of the photoconductive stripes $C_1$, $C_2$, . . . , $C_6$ in succession, and the ends of the resistance areas $r_1$, $r_2$, . . . , $r_6$ located at one side of the substrate 1 are connected commonly to an output electrode $P_o$.

In this example of the photoconductive memory element, the irradiation is carried out by the use of a slit of a desired pattern A. In a stripe $C_1$ of the photoconductive layer, if a part F thereof is irradiated by a light ray passing through a patterned slit A, the resistance of the part F is substantially reduced thereby to connect the electrode $P_1$ to the resistance stripe $r_1$ through the part F.

Accordingly, the resistance value between the terminal $T_1$ and the output terminal T out of the readout device corresponds to the resistance of a part of the resistance stripe $r_1$ falling between one edge K of the irradiating pattern A and the output electrode $P_o$. Since the pattern A of the slit used for irradiating the memory element can be selected to assume any desired configuration, the connection between the electrode $P_1$ and the resistance stripe $r_1$ can be attained through the reduced resistance part F selected in accordance with the desired pattern. Thus, it will be apparent that the reduced resistance part F is equivalently acting as a sliding contact in a variable resistor formed by the resistance stripe $r_1$.

Although the function of the memorizing element has been described with respect to a specific resistance stripe $r_1$, it will be apparent that the same relation is also applicable to other resistance stripes $r_2$, $r_3$, . . . , $r_6$.

Figure 6:
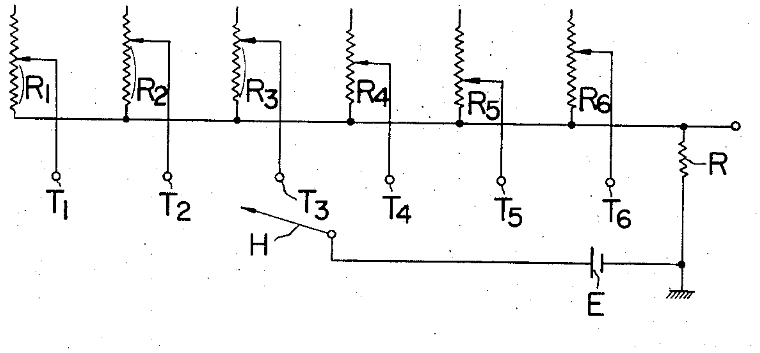
FIG. 6 is an electrical equivalent circuit for the device using the memorizing element shown in FIG. 5.

FIG. 6 indicates an equivalent circuit of the example illustrated in FIG. 5, wherein $R_1$, $R_2$, . . . , $R_6$ correspond to resistance values of the parts of the resistance stripes falling between the lower edge K of the irradiating pattern A and the output electrode $P_o$. Whenever a sliding contact H of a rotary type switch in the readout device is connected successively to terminals $T_1$, $T_2$, . . . , $T_6$, voltages corresponding to the resistance values of $R_1$, $R_2$, . . . , $R_6$ can be read out across a resistor R in the readout device, and these values in turn define the configuration of the irradiation pattern A.

Figure 7:
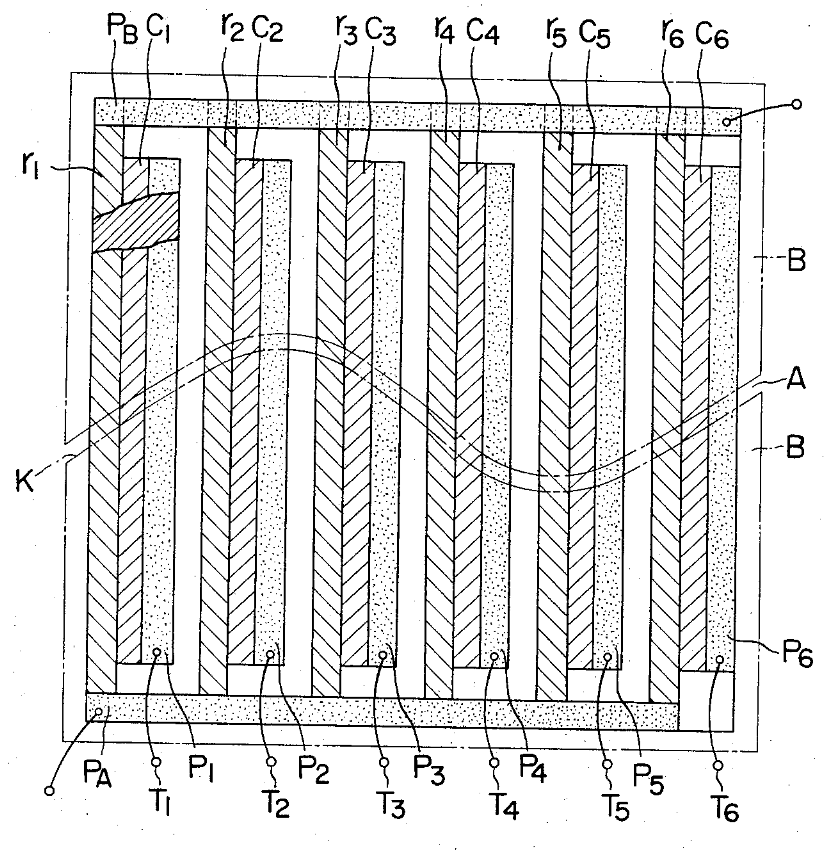
FIG. 7 is a plan view showing a further example of the memorizing element to be used with a slit-light mask.
Figure 8:
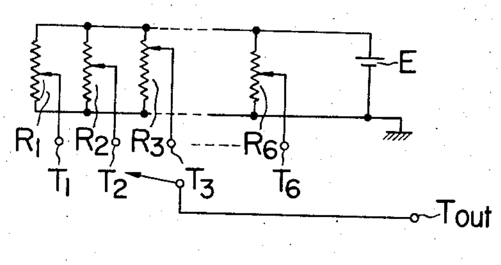
FIG. 8 is an electrical equivalent circuit for the device using the memorizing element shown in FIG. 7.

In FIG. 7, there is indicated still another example (fourth example) of the memorizing element, wherein an electrode $P_A$, similar to the electrode $P_o$ in FIG. 6, is connected to the ends of the resistance stripes $r_1$, $r_2$, . . . , $r_6$ on one end, and another electrode $P_B$ is connected to the other ends of the resistance stripes. A constant voltage E is applied across the $P_A$ and $P_B$, and voltages corresponding to the resistance values $R_1$, $R_2$, . . . , $R_6$ can be read out from the output terminal. FIG. 8 indicates an equivalent circuit of this memorizing element operable in cooperation with the readout device. In this equivalent circuit, a sliding contact H is successively brought into contact with the terminals $T_1$, $T_2$, . . . , $T_6$, whereby voltages indicative of the irradiation pattern A can be obtained from the output terminal T out.

Figure 13:
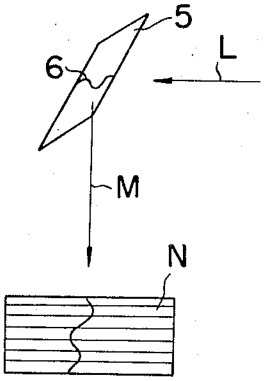
FIGS. 13 and 14 are diagrams indicating modes of irradiation which are used for realizing a slit-light pattern.

In the fourth example of the memorizing element shown in FIGS. 7 and 8, various types of irradiating masks, in addition to that shown in FIG. 3(c), may be used for providing a slit-passing light pattern. For instance, a pattern 6 may be formed by utilizing a silver point on a glass plate 5 as shown in FIG. 13, and a light beam may be introduced from an arrow-marked direction L, so that the reflected light M from the pattern 6 is irradiated onto the photoconductive layer of the memorizing element as shown in FIG. 7.

Figure 14:
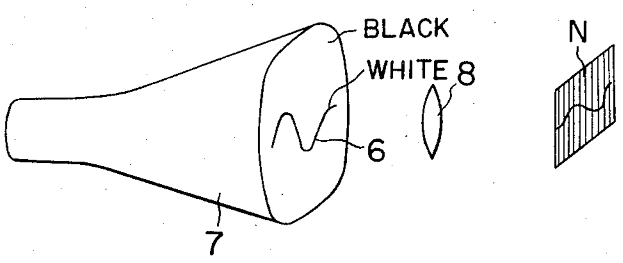

Otherwise, a wave formed pattern 6 of white may be drawn on the screen of a cathode ray tube 7, and this waveform 6 may be projected through a suitable lens system 8 on the surface of a memorizing element N as shown in FIG. 14. In this manner, if the scanning speeds in the cathode-ray tube and in the memorizing element N are differentiated from each other, the frequency characteristics of the output waveform obtained from the memorizing element N may be made different from those of the original pattern 6 formed on the cathode-ray tube. Such a feature constitutes an additional advantage of this example.

Still another example of the memorizing element is generally indicated in FIG. 9(a). In this fifth example of the memorizing element, a plurality of band-like areas (or stripes) $l_1$, $l_2$, . . . , $l_8$, of a constant width, of an electrically conductive layer are deposited in an equally spaced apart relationship on the upper surface of the substrate 1 made of, for instance, a glass plate, with the ends of the stripes $l_1$, $l_2$, . . . , $l_8$ on one side being connected to a vertically extending photoconductive stripe $P_l$.

Furthermore, on the other side surface of the substrate 1, there are provided a plurality of stripes $m$, $m_2$, . . . , $m_8$ of an electrically conductive layer, having a constant width and being arranged in a constantly spaced apart relationship in such a manner that the stripes $m_1$, $m_2$, . . . , $m_8$ extend perpendicularly to the first-mentioned stripes $l_1, l_2, \ldots, l_8$. At the regions where the two kinds of stripes are overlapped through the thickness of the glass substrate with the first group of stripes disposed on one surface of the substrate and the second group of stripes disposed on the other surface of the substrate, there are provided photoconductive areas $Cd_1, Cd_2, \ldots, Cd_{80}$, each of which is connected to an electrically conductive body Q buried in the substrate at the overlapping region.

When these photoconductive areas are irradiated by light, the first and the second groups of electrically conductive stripes $l_1, l_2, \ldots, l_8$, and $m_1, m_2, \ldots, m_8$, mutually crossing at these regions, are interconnected through the photoconductive areas and the electrically conductive bodies Q buried in these regions (refer to FIG. 9(b) ). In this example, there is further provided a photoconductive stripe $P_l$ which may exhibit a desired conductivity (or a resistance) when the stripe $P_l$ is exposed to light. However, this may be substituted by a stripe of an ordinary resistor, thus constituting a further modification of this example.

In FIG. 10, there is indicated a mask in the form of a card 9 which is used for irradiating the photoconductive areas $Cd_1, Cd_2, \ldots, Cd_{80}$. Each part marked by a square □ in FIG. 10 is a weakened part in the mask card 9, and a part marked by a slashed square ▨ is a square hole formed by removing paper tissue from the weakened part □. In the mask card 9, there is also provided an elongated rectangular hole 10 used for irradiating the photoconductive stripe $P_l$.

Between the terminals $T_{12}$ and $T_{11}$ of the memorizing element shown in FIG. 9, a predetermined voltage source may be connected when the element cooperates with a readout device as described before. Accordingly, when the memorizing element is exposed to light through the mask card 9, a voltage appearing at a position along the photoconductive stripe $P_l$ corresponding to an overlapping point of the stripes $l_3$ and $m_1$ is obtained from the terminal $T_1$, and another voltage appearing at another position of the photoconductive stripe $P_l$ corresponding to the overlapping point of the stripes $l_4$ and $m_2$ is obtained from the terminal $T_2$. This relation is applicable to the rest of the terminals $T_3, \ldots, T_{10}$, and voltages corresponding to the overlapping points exposed to light can be obtained from the corresponding terminals.

As a result, the equivalent electrical circuit of the memorizing element shown in FIG. 9(a) operating in cooperation with a readout device as described will be identical to the circuit shown in FIG. 8, and when the terminals $T_1, T_2, \ldots, T_{10}$ thereof are successively scanned by a sliding contact H of the readout device, an output voltage varying in accordance with the pattern defined by the holes in the mask card 9 is obtained from the output terminal T out.

Figure 11A:
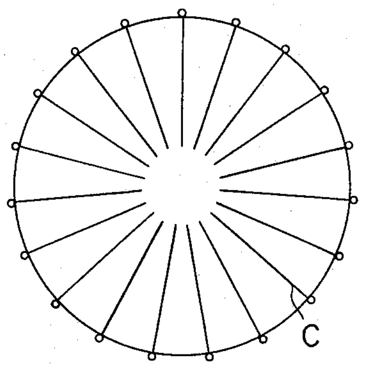
FIGS. 11(a) through 11(c) are plan views showing various examples of modified arrangements of the photoconductive stripes on a memorizing element.
Figure 11B:
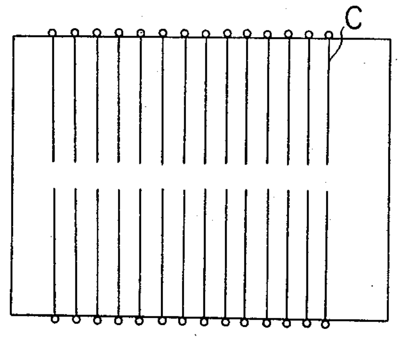
Figure 11C:
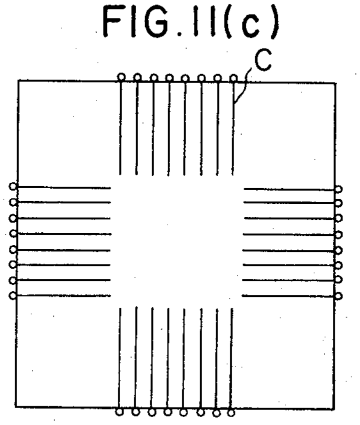

FIGS. 11(a), 11(b), and 11(c) indicate various modifications which may be carried out on the arrangement of the photoconductive stripes C. Of these modified arrangements, that shown in FIG. 11(a) is an example wherein the photoconductive stripes C are radially arranged on the substrate so that the terminals to be connected with the readout device are provided on the circumferential ends of the radially arranged photoconductive stripes.

In another modification shown in FIG. 11(b), two groups of photoconductive stripes are arranged side by side on a rectangular substrate so that the inner ends thereof are disposed toward a center line of the substrate, and the terminals to be scanned are provided on the outer ends of the photoconductive stripes.

In still another modification of the arrangement shown in FIG. 11(c), four groups of photoconductive stripes C are arranged in such a manner that they are disposed inwardly from four sides of a square substrate, and the terminals to be scanned are provided on the outer ends of the photoconductive stripes. In either of these arrangements, the terminals to be scanned are arranged outwardly so that they may be connected easily to corresponding terminals of the readout device.

In FIGS. 12(a) through 12(d), there are indicated various examples of light irradiating arrangements employable with the memory device of the present invention. In these examples, light rays from a light source LS are projected onto, a substrate S of the memorizing element through a mask M which, in an example shown in FIG. 12(a), comprises a transparent plastic plate 2 and a black plastic plate 3 in combination.

Figure 12B:
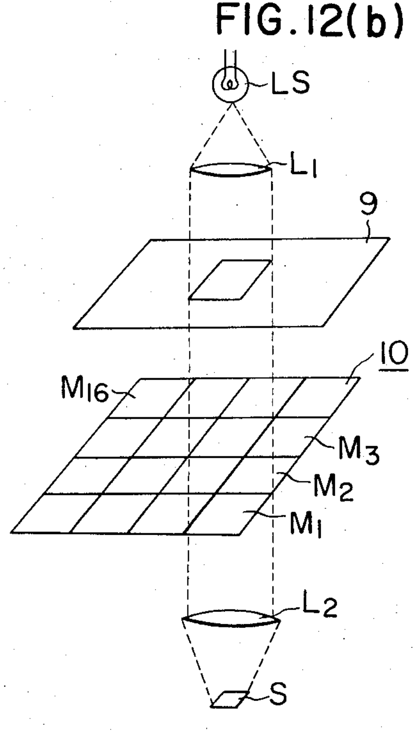
FIGS. 12(a) through 12(d) are perspective views showing various modes of irradiation which can be used in the memorizing device of this invention.
Figure 12A:
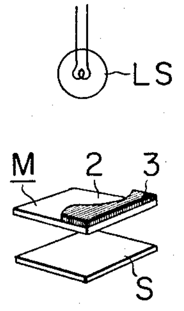

In another arrangement shown in FIG. 12(b), there is provided a mask 10 including a plurality of masking units $M_1, M_2, \ldots, M_{16}$, and the light rays from the light source LS are projected onto the substrate S of the memorizing element through a lens $L_1$, a light guiding plate 9, one of the masking units $M_1, M_2, \ldots, M_{16}$, and another lens $L_2$. By moving the mask 10 in lateral directions, any desired masking unit may be selected so that the substrate S of the memory device may be irradiated through the masking unit of a desired pattern.

Figure 12C:
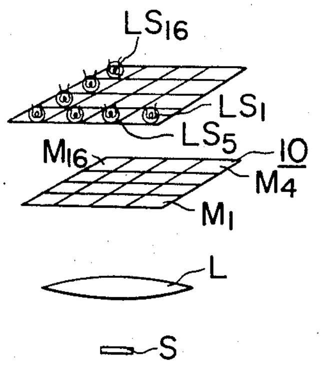

In still another example shown in FIG. 12(c), a plurality of light sources $LS_1, LS_2, \ldots, LS_{16}$ are provided in correspondence with the masking units $M_1, M_2, \ldots, M_{16}$. By switching any one of the light sources $LS_1, LS_2, \ldots, LS_{16}$ to ON state, the substrate S of the memorizing element can be irradiated through the masking unit of a desired pattern.

Figure 12D:
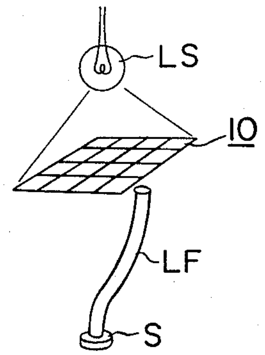

In still another arrangement of light exposure shown in FIG. 12(d), the entire surface of mask 10 is exposed to the light emitted from the light source LS, and the selection of the masking units is attained through an optical fiber LF one end of which is moved to a desired masking unit.

Since the memory device according to the present invention is organized as described above, an analog quantity corresponding to a desired light pattern can be memorized in the memorizing element, and because the pattern can be selected from a plurality of masking units, the analog quantity memorized in the memorizing element can be readily varied.

We claim:

1. A photoconductive memory device comprising at least one memorizing element and a mask, said memorizing element comprising a non-conductive substrate, a photoconductive layer disposed on substantially the entire surface of said substrate and two groups of electrodes disposed over said photoconductive layer, one group including a plurality of electrically conductive stripes ($P_1, P_2, \ldots, P_5$) arranged in parallel on said photoconductive layer so as to form photoconductive stripes therebetween, the other group including an output electrode ($P_o$) branched into a plurality of electrode portions ($Pl_1, Pl_2, \ldots Pl_6$) arranged alternatively with the electrically conductive stripes ($P_1, P_2, \ldots, P_5$), and said mask comprising a transparent path and an opaque part delimited by a marginal area conforming to a pattern corresponding to a shape of a wave to be memorized, whereby when said photoconductive stripes are irradiated by light through said mask, the shape of the wave can be memorized as sampled analog values in said memorizing element in the form of a plurality of electrical resistances defined by the marginal area in said mask.

2. A photoconductive memory device comprising at least one memorizing element and a mask, said memorizing element comprising a non-conductive substrate and a plurality of stripes made in the form of a photoconductive layer disposed on said substrate, and said mask comprising a transparent part and an opaque part delimited by a marginal area conforming to a pattern corresponding to a shape of a wave to be memorized, whereby when said photoconductive stripes are irradiated by light through said mask, the shape of the wave can be memorized as sampled analog values in said memorizing element in the form of a plurality of electrical resistances defined by the marginal area in said mask.

3. A memory device as set forth in claim 2 wherein a device is further provided for reading out the wave shape thus memorized in said memorizing element.

4. A memory device as set forth in claim 2 wherein two groups of electrodes are further provided in said memorizing element, one group including a plurality of connecting terminals ($P_1$, $P_2$, . . . , $P_{10}$) connected to one of the ends of said plurality of photoconductive stripes on one side, and the other group including a common terminal $P_o$ provided at the other end on the other side of said photoconductive stripes.

5. A device as set forth in claim 2 wherein said plurality of electrical resistances are substantially defined by the parts of said photoconductive stripes not exposed to the light.

6. A device as set forth in claim 2 wherein said plurality of electrical resistances obtained from a plurality of resistance stripes ($r_1$, $r_2$, . . . , $4_6$) are further provided in adjacent to said photoconductive stripes.

7. A device as set forth in claim 2 wherein additional stripes are formed as connecting electrodes ($P_1$, $P_2$, . . . , $P_6$) are further provided at one side of said photoconductive stripes ($C_1$, $C_2$, . . . , $C_6$), respectively, and a plurality of resistance stripes ($r_1$, $r_2$, . . . , $r_6$) are further provided on the other side of said photoconductive stripes.

* * * * *